(12) United States Patent
Coates et al.

(10) Patent No.: US 7,352,363 B2
(45) Date of Patent: Apr. 1, 2008

(54) SINGLE FINGER OR THUMB METHOD FOR TEXT ENTRY VIA A KEYPAD

(75) Inventors: Justine E. Coates, White Rock (CA); Timothy D. Sharpe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 550 days.

(21) Appl. No.: 10/607,928

(22) Filed: Jun. 27, 2003

(65) Prior Publication Data

US 2004/0264690 A1 Dec. 30, 2004

(51) Int. Cl.
G09G 5/00 (2006.01)

(52) U.S. Cl. .............. 345/169; 345/172; 345/173; 341/22; 341/23; 379/93.18; 379/368

(58) Field of Classification Search ........... 345/168, 345/169, 171–173; 341/22, 23; 379/93.18, 379/368; 700/84
See application file for complete search history.

(56) References Cited

U.S. PATENT DOCUMENTS

| | | | |
|---|---|---|---|
| 4,694,280 A * | 9/1987 | Rollhaus et al. .......... 341/26 |
| 6,184,803 B1 * | 2/2001 | Burrell, IV ............... 341/22 |
| 6,378,234 B1 * | 4/2002 | Luo ........................ 341/22 |
| 6,765,556 B2 * | 7/2004 | Kandogan et al. ....... 345/168 |
| 6,909,382 B2 * | 6/2005 | Trell ....................... 341/20 |

* cited by examiner

*Primary Examiner*—Henry N Tran
(74) *Attorney, Agent, or Firm*—Christensen O'Connor Johnson Kindness PLLC

(57) ABSTRACT

A single press method for entering text using a keypad is disclosed. A conventional four-row by three-column 12-key keypad is used to enter all of the letters of the alphabet using single key actuation. Depending on the letter, either a single key or multiple side-by-side keys, such as a pair of side-by-side keys, that can be substantially simultaneously depressed by a user's finger or thumb are used to enter alphabet letters.

25 Claims, 5 Drawing Sheets

SINGLE FINGER OR THUMB METHOD FOR TEXT ENTRY VIA A KEYPAD

FIELD OF THE INVENTION

This invention relates to keypads and, more particularly, to entering text using keypads.

BACKGROUND OF THE INVENTION

Keypads are commonly used to enter alphanumeric data. Conventional 12-key keypads formed of a four-row by three-column matrix of keys were developed when the telephone system changed from rotary dial to touchtone telephones. Each time the key of a touchtone telephone is depressed, a dual-tone multifrequency (DTMF) signal is generated. The two tones identify the key that was depressed. Originally, conventional 12-key keypads were used to enter numeric data—the integers from 0 to 9—plus the * sign and the # sign. As the telephone system evolved from a land line system to a cellular telephone system, and as telephone communication evolved from voice communication to data communication, the use of keypads has evolved and changed. Many modern keypads are used to enter text formed of the letters of the alphabet and symbols as well as numbers. Because the number of letters of many languages, such as the English language, is greater than the number of keys on 12-key keypads, in the past, multiple letters have been associated with selected keys of contemporary 12-key keypads. Multiple depressions of the selected keys in rapid succession result in the entry of a specific letter. For example, the number 2 key of a conventional 12-key keypad includes the letters A, B, C; the number 3 key includes the letters D, E, F, etc. Letters are entered into the memory of a related device, such as a cellular telephone, for example, by rapidly actuating, i.e., depressing and releasing, a particular key the number of times related to the letter. For example, in the case of the number 2 key, one actuation enters the letter A, two rapid actuations enter the letter B, and three rapid actuations enter the letter C. A predetermined interval after the last actuation results in the software that interprets the key presses spacing forward to the next letter position. The # sign key functions as a backspace key and is used to correct text entry errors. Obviously, entering text by the rapid actuation of selected keypad keys is both time consuming and error prone. As a result, various software and hardware proposals have been made to improve the data entry using keypads, in particular 12-key keypads. Some of these proposals have been implemented.

One software proposal is for the device employing a keypad to contain a dictionary of words stored in memory that are accessed as keys are actuated. More specifically, the key actuations are mapped to the words stored in memory using predictive software. One example of such a software proposal is the T9 text entry system. The T9 text entry system predictively compares single key actuations to dictionary words to enter text. For example, actuating in sequence the keys bearing the numbers 2 (A, B, C), 6 (M, N, O) and 3 (D, E, F) once would result in the entry of the word "AND" based on the prediction that "AND" is the most likely word that the user desires to enter. T9 type text entry systems usually have the ability to scroll to the next most commonly used word if a series of choices are available by pressing a non-letter key, such as the "0" key.

While T9 type text entry systems are an improvement over multiple actuation text entry systems, T9 type text entry systems have some disadvantages. For example, if a word is not in the dictionary stored in memory, it may be difficult, if not impossible, to enter a desired word. This disadvantage is of particular significance when a user desires to enter individuals' names, due to the wide variations in both family and given names.

In addition to software solutions to improve text entry using a 12-key keypad, hardware solutions have been proposed. One hardware proposal has been to include a rocker switch whose position determines the letter entered using a multiple letter key. Obviously, this approach requires additional hardware, which increases the complexity of keypads and, thus, the cost of producing keypads. Further, mechanical switches are subject to wear and breakage.

Another prior art hardware proposal is to overlay the keypad with a matrix of capacitive sensors, one associated with each key. When a user's digit, i.e., a user's finger or thumb, is moved along a predetermined path of travel over such a capacitive sensing system, a letter is entered. For example, moving a user's finger or thumb from the letter 5 to the letter 1 to the letter 2 to the letter 3 and back to the letter 5 may result in the entry of the letter "C." One of the obvious disadvantages of this hardware solution is that the user's moving digit must remain within a predetermined distance of the capacitive sensor. Further, the movement must be continuous. These disadvantages, as well as the need to learn a specific path of travel for each letter or symbol to be entered, makes this proposal unacceptable in most environments.

In summary, prior software and hardware proposals for entering text using a keypad, in particular a conventional 12-key keypad, have not been entirely satisfactory. Consequently, a need exists for a new and improved text entry method using a keypad. Preferably, the solution will not require any change to the keypad hardware. Rather, the solution will be implementable in software, which is relatively easy and inexpensive to change.

SUMMARY OF THE INVENTION

In accordance with this invention, a single press method for entering text using a keypad is provided. The items of text may be letters, symbols, or characters. In one exemplary embodiment of the invention, a conventional four-row by three-column, 12-key keypad is used to enter all of the letters of the English language alphabet using single presses. Depending on the letter, either a single key or multiple keys, such as a pair of side-by-side keys, that can be substantially simultaneously actuated, i.e., pressed and released, by a user's thumb or finger are used to enter the letters of the alphabet.

In accordance with further aspects of this invention, a keystroke identifier continuously monitors the actuation status of the keys of the keypad. When the keypad is in a text entry mode of operation, key actuation is analyzed by a keystroke recognizer that determines whether a single key or multiple keys were actuated.

In accordance with still further aspects of this invention, depending on the nature of the keypad hardware with which the invention will be used, the keystroke identifier responds to either key releases or key depressions.

In accordance with yet other aspects of this invention, the keystroke recognizer determines if key actuation represents a letter of the alphabet, a function action, such as a backspace, or a mode of operation change, such as shifting from an upper-case letter entry mode of operation to a lower-case letter entry mode of operation.

In accordance with yet still further aspects of this invention, the keystroke identifier and the keystroke recognizer map key actuation to either letters, function actions, or mode of operation changes.

In accordance with yet still other aspects of this invention, the keystroke identifier records the time between key releases and the keystroke recognizer uses the time between key releases to determine the nature of the response to the actuation of the keys of the keypad.

As will be readily appreciated from the foregoing description, the invention provides a new and improved method for entering text using a keypad. The actuation of a single key or the simultaneous actuation of multiple side-by-side keys allows a user to enter a letter of the alphabet with a single finger or thumb action. Multiple actuations of the same key are not required. If desired, the invention can be implemented in combination with predictive software employing a dictionary stored in memory to further increase the speed with which text can be entered. Even when so combined, any word, name, etc., can be entered since the invention is not limited to the words contained in the dictionary.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As will be better understood from the following description, the invention is directed to a software-implementable method of entering text using a keypad. The invention can be implemented with any keypad having a number of keys fewer than the number of letters, symbols, or characters to be entered. Thus, while the invention is described in combination with a conventional keypad formed by 12-keys in a four-row and three-column matrix, it is to be understood that the invention can be implemented with other keyboards. In addition, while the invention is described in connection with the entry of the letters of the English language, it is to be understood that the invention is equally suitable for entering symbols employed in English language text entry as well as characters of other languages. While it is possible that the invention could be implemented in combination with keyboards having keys spaced apart such that they can be simultaneously depressed by two digits, i.e., fingers, of a user's hand, the invention was developed for implementation with keypads having keys that are located close enough to one another that a single digit of a user's hand, either a finger or a thumb, can be used to simultaneously actuate multiple keys, most likely two keys in most implementations of the invention, that are either horizontally or vertically located side by side.

While the invention was developed for use in devices having 12-key keypads, such as cellular telephones, as noted above, it is to be understood that the invention may find use in combination with other keypads or in devices other than cellular telephones.

Figure 1:
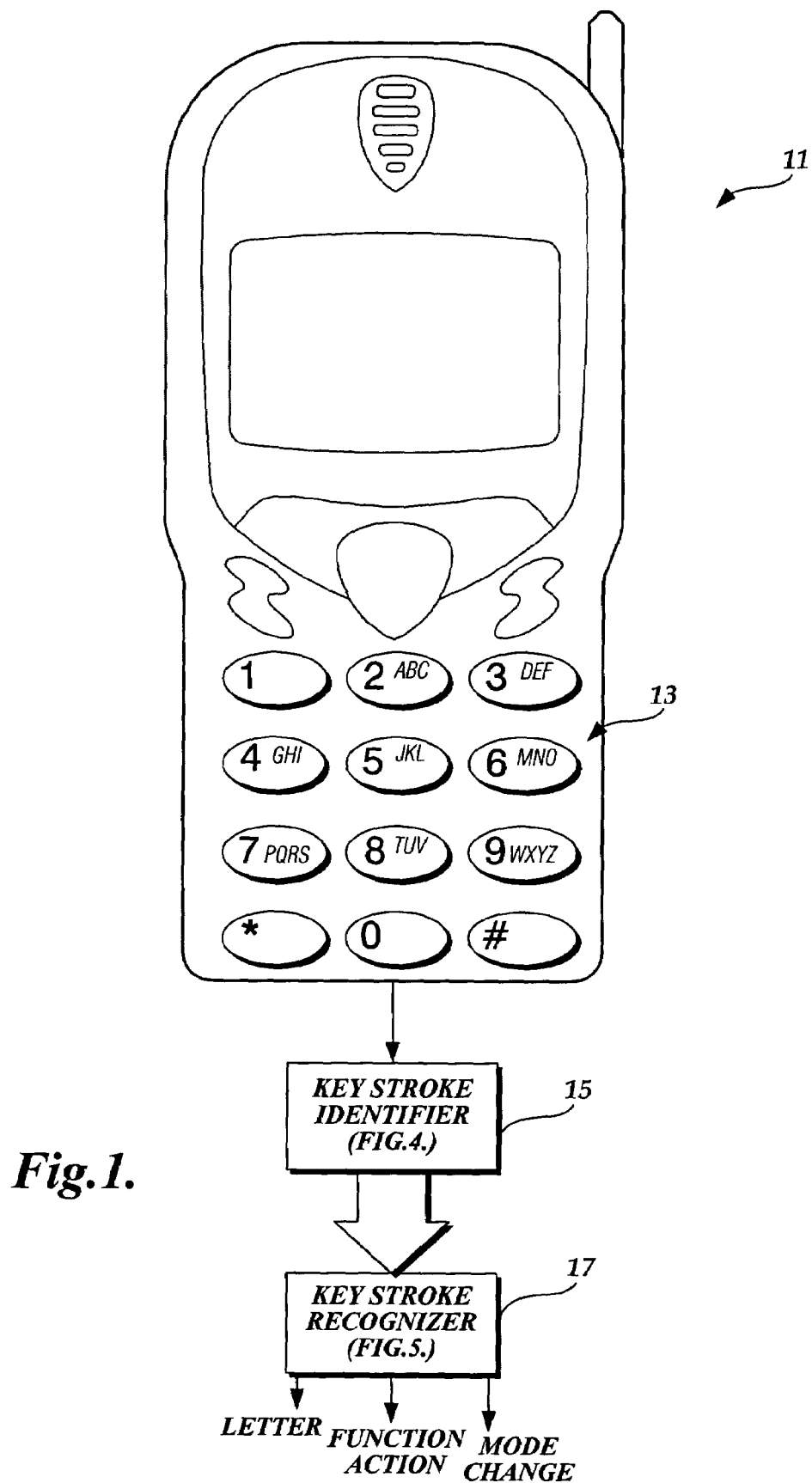
FIG. 1 is a partially pictorial and partially block diagram of an exemplary embodiment of the present invention.

FIG. 1 includes a pictorial diagram of a cellular telephone 11, which includes a keypad 13. The keypad is a 12-key keypad comprising three rows and four columns. The 12-key keypad 13 is a conventional 12-key keypad in that the three keys of the first row are identified as the number 1, number 2, and number 3 keys, the three keys of the second row are identified as the number 4, number 5, and number 6 keys, the three keys of the third row are identified as the number 7, number 8, and 9 keys, and the three keys of the fourth row are identified as the number *, number 0, and # keys. Further, the number 2 key bears the English alphabet letters A, B, C, the number 3 key bears the English letters D, E, F, the number 4 key bears the English letters G, H, I, the number 5 key bears the English letters J, K, L, the number 6 key bears the English letters M, N, O, the number 7 key bears the English letters P, Q, R, S (or in some cases just P, R, S), the number 8 key bears the letters T, U, V, and the number 9 key bears the letters W, X, Y, Z (or in some cases just W, X, Y).

FIG. 1 also includes, in block form, a keystroke identifier 15 and a keystroke recognizer 17. The keystroke identifier 15 is connected to the keypad 13 of the cellular telephone 11 and detects the actuation (press and release) of the keys of the keypad. The keystroke identifier supplies the detected key actuation data to the keystroke recognizer 17, which interprets the data and produces an output that indicates whether the key actuations designated a letter entry, a function action, such as a backspace, or a mode of operation change. Mode of operation changes include, but are not limited to, switching the keypad 13 between a numeric entry mode of operation to a text entry mode of operation and switching the mode of operation between an upper-case letter entry mode of operation to a lower-case letter entry mode of operation.

Figure 2:
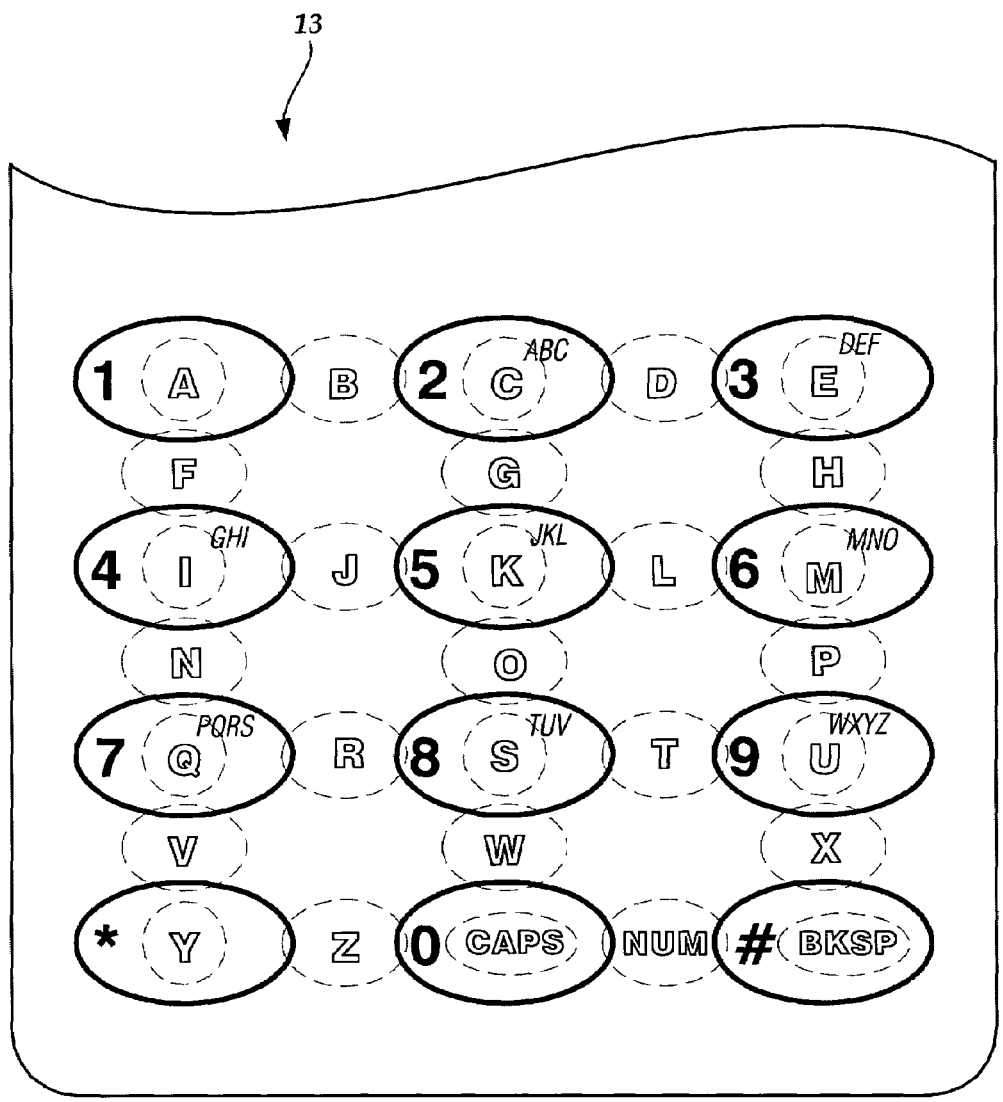
FIGS. 2 and 3 are enlarged views of the keypad shown in FIG. 1 overlaid with letters entered by single and simultaneous side-by-side key actuations.
Figure 3:
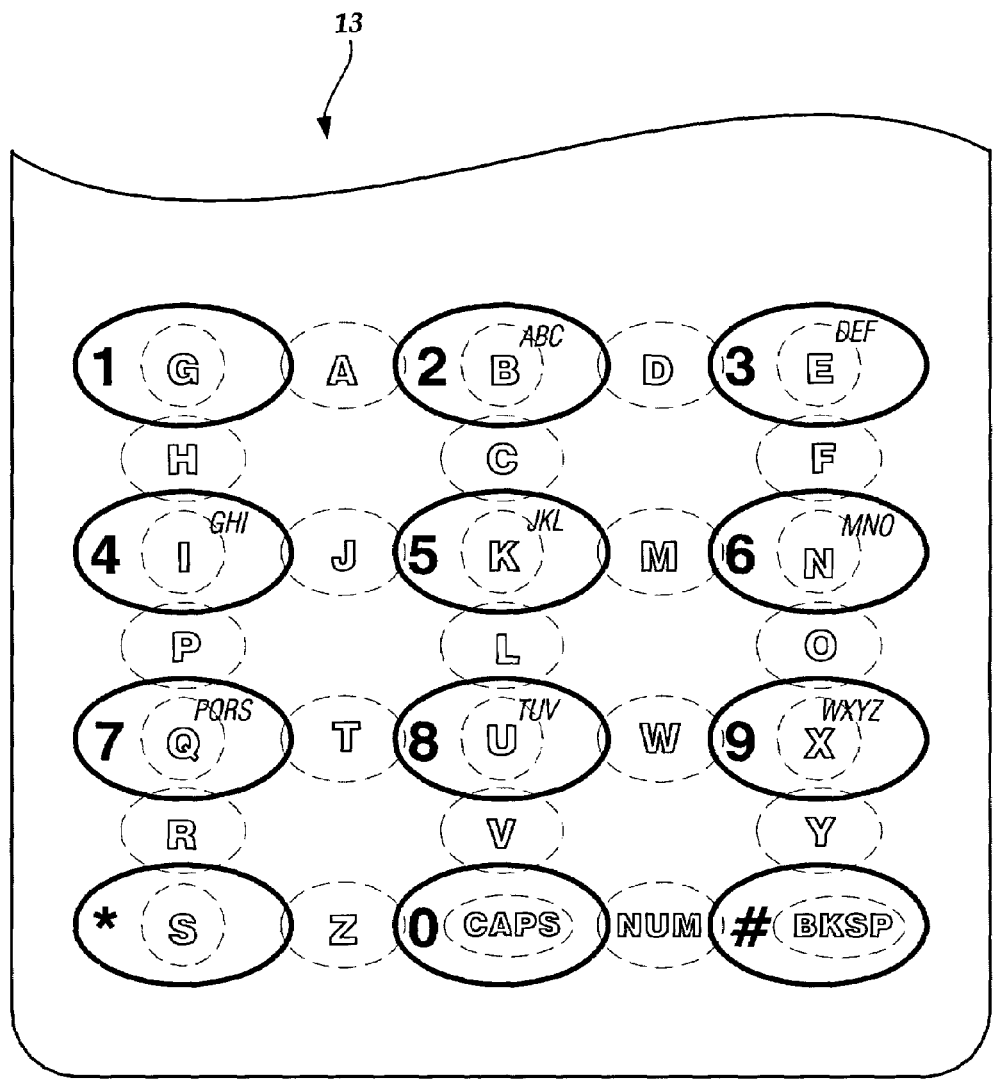

FIGS. 2 and 3 are pictorial views of the keypad 13 of the cellular telephone 11 illustrated in FIG. 1, overlaid with letters entered by single and simultaneous side-by-side key actuations, or functions or mode changes created by such actuations. The overlay may be a mental overlay, or a real overlay. More specifically, in addition to the numbers and letters on the keys of the keypad 13 that are illustrated in FIG. 1 and described above, which are normally embossed in and/or printed on the keys, FIGS. 2 and 3 also illustrate an overlay. The overlay is represented by dashed circles and ovals and double-lined letters located inside the circles and ovals. The overlay may be a mental overlay, meaning that the overlay is not actually embedded or painted on the keyboard or the keyboard supporting structure, or if desired, at least part of the overlay may be a real overlay. For example, the double-lined characters could be imprinted or embossed on the keys of the keypad 13 and the adjacent keyboard supporting structure in the positions illustrated in FIGS. 2 and 3.

FIGS. 2 and 3 illustrate two different overlays and, thus, two different ways of implementing the present invention which, as is noted above, is the use of single and simultaneous side-by-side key actuations to enter the letters of an alphabet whose number of letters are greater than the number of keys forming the keypad 13. For example, in the illustrated embodiment of the invention, the 12-keys of the 12-key keypad 13 are used to enter the 26 letters of the English alphabet plus a selected function and two mode changes. More specifically, as described more fully below, in addition to entering the 26 letters of the English language, selected key actuations cause (i) the keypad to switch between an upper-case letter entry mode of operation to lower-case letter entry mode of operation and vice versa, (ii) the keypad to switch between a text mode of operation to a number mode of operation and vice versa, and (iii) the software interpreting entered letters to backspace to allow erroneous letter entries to be corrected.

FIG. 2 illustrates a relatively straightforward approach to entering letters using a 12-key keypad. In this text entry method, the letters are entered in seriatim moving from left to right starting with the letter A. More specifically, actuating the number 1 key alone enters the letter A, and simultaneously actuating the number 1 and number 2 keys enters the letter B. Actuating the number 2 key alone enters the letter C, and simultaneously actuating the number 2 and number 3 keys enters the letter D. Actuating the number 3 key alone enters the letter E. Simultaneously actuating the number 1 and number 4 keys enters the letter F, simultaneously actuating the number 2 and number 5 keys enters the letter G, and simultaneously actuating the number 3 and number 6 keys enters the letter H. Actuating the number 4 key alone enters the letter I, and simultaneously actuating the number 4 and number 5 keys enters the letter J. Actuating the number 5 key alone enters the letter K and simultaneously actuating the numbers 5 and 6 keys enters the letter L. Actuating the number 6 key alone enters the letter M.

Simultaneously actuating the number 4 and number 7 keys enters the letter N, simultaneously actuating the number 5 and number 8 keys enters the letter O, and simultaneously actuating the number 6 and number 9 keys enters the letter P. Actuating the number 7 key alone enters the letter Q, and simultaneously actuating the number 7 and number 8 keys enters the letter R. Actuating the number 8 key alone enters the letter S, and simultaneously actuating the number 8 and number 9 keys enters the letter T. Actuating the number 9 key alone enters the letter X. Simultaneously actuating the number 7 and the * keys enters the letter V, simultaneously actuating the number 8 and number 0 keys enters the letter W, and simultaneously actuating the number 9 and the # keys enters the letter X. Actuating the * key alone enters the letter Y, and simultaneously actuating the * key and the number 0 key enters the letter Z.

The actuation of the number 0 key alone toggles the keypad 13 between an upper-case letter entry mode of operation and a lower case letter entry mode of operation. Simultaneously actuating the number 0 key and the # key toggles the keypad between a number entry mode of operation and a text or letter entry mode of operation. Finally, actuating the # key alone creates a backspace function, i.e., tells the software interpreting the letter entry data to backspace so that an erroneous letter entry can be corrected.

FIG. 3 illustrates a text entry system wherein, to some degree, the conventional letters on the number 2 through number 9 keys are employed to guide a user. For example, the number 2 key includes the letters A, B, C. This letter sequence is used to inform a user that A is entered by simultaneously actuating the number 1 and number 2 keys. B is entered by actuating the number 2 key alone, and C is entered by simultaneously actuating the number 2 and number 5 keys. In other words, A designates a shift to the left, B designates the center, and C designates a shift down. The number 2, number 3, and number 6 keys are similarly used to enter the letters D, E, F. More specifically, the simultaneous actuation of the number 2 and number 3 keys enters the letter D. The letter E is entered by actuating the number 3 key alone, and the letter F is entered by simultaneously actuating the number 3 and number 6 keys.

The keys located on the left side of the keyboard provide a somewhat different guide. The number 4 key includes the letters G, H, I. G is entered by actuating the number 1 key alone. H is entered by simultaneously actuating the number 1 and number 4 keys. I is entered by actuating the number 4 key alone. The letters J, K, L, M, N, and O are entered similar to the letters A, B, C, D, E, and F. More specifically, J is entered by simultaneously actuating the number 4 and number 5 keys. K is entered by actuating the number 5 key alone, and L is entered by simultaneously actuating the number 5 and number 8 keys. M is entered by simultaneously actuating the number 5 and number 6 keys, and N is entered by actuating the number 6 key alone. O is entered by simultaneously actuating the number 6 and number 9 keys.

Switching back to the left side of the keypad, P is entered by simultaneously actuating the number 4 and number 7 keys, Q is entered by actuating the number 7 key alone, R is entered by simultaneously actuating the number 7 and * keys, and S is entered by actuating the * key alone. The letters T, U, V, W, X, and Y are entered similarly to the letters A, B, C, D, E and F. More specifically, the simultaneous actuation of the number 7 and number 8 keys enters the letter T. Actuation of the number 8 key alone enters the letter U, and the simultaneous actuation of the number 8 and number 0 keys enters the letter V. The letter W is entered by the simultaneous actuation of the number 8 and number 9 keys, and X is entered by the actuation of the number 9 key alone. Y is entered by the simultaneous actuation of the number 9 and the # keys. Z is entered by the simultaneous actuation of the * and number 0 keys.

As with FIG. 2, actuation of the number 0 key alone toggles the keypad between a capitals entry mode of operation and a lower case mode of operation. The simultaneous actuation of the number 0 and # keys toggles the keyboard between a number entry mode of operation and a text entry mode of operation and the actuation of the # key alone causes a backspace to occur.

Figure 4:
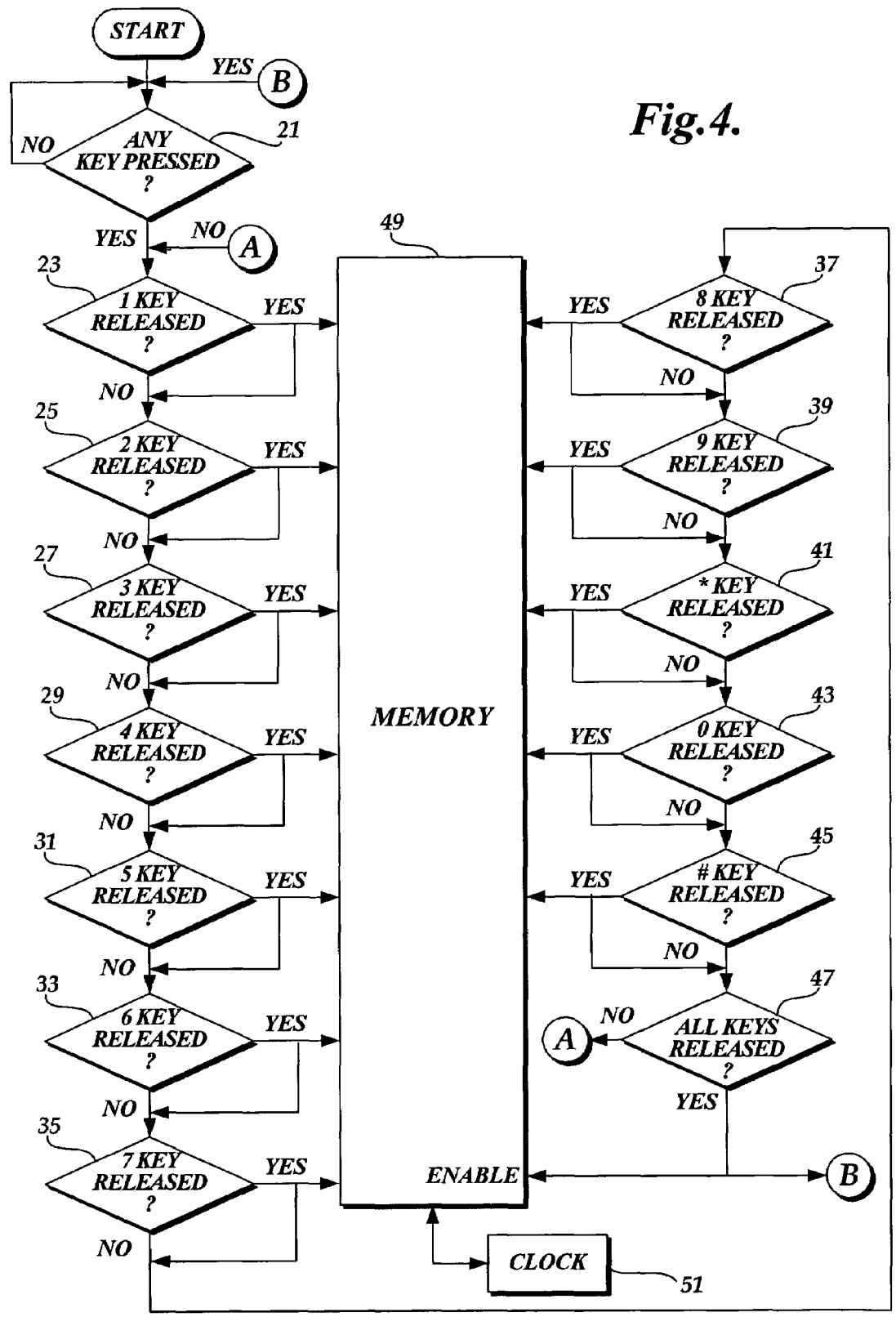
FIG. 4 is an exemplary partially functional flow and partially block diagram of a keystroke identifier suitable for use in FIG. 1.
Figure 5:
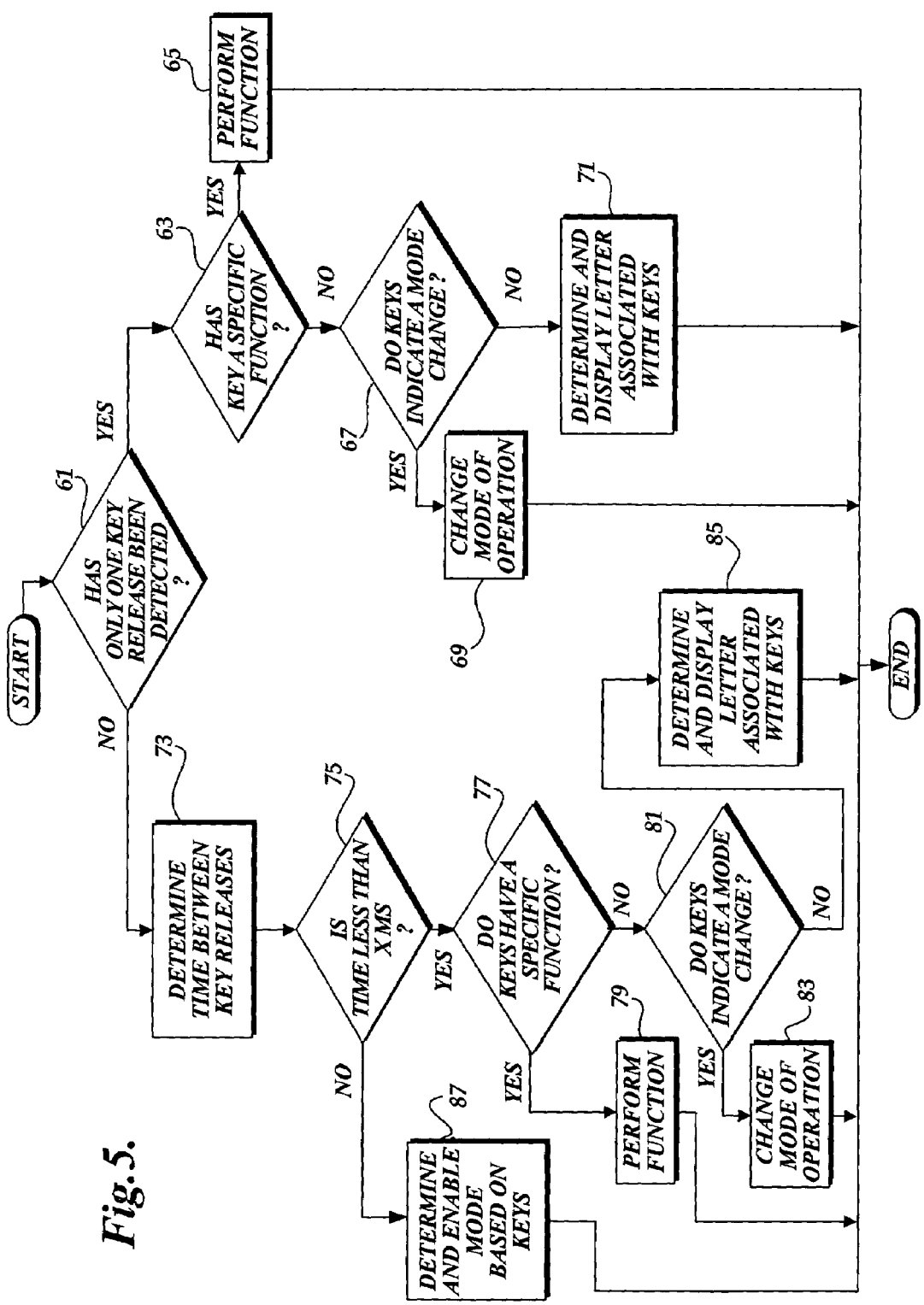
FIG. 5 is an exemplary functional flow diagram of a keystroke recognizer suitable for use in FIG. 1.

FIGS. 4 and 5 are simplified block/functional flow diagrams of an exemplary keystroke identifier and an exemplary keystroke recognizer, respectively, suitable for use in FIG. 1. Because FIGS. 4 and 5 are directed to illustrating the functionality of the keystroke identifier and the keystroke recognizer, they should be construed as exemplary and not limiting. Those skilled in the art will recognize that there are many other ways to implement the functions performed by the keystroke identifier and the keystroke recognizer.

The keystroke identifier illustrated in FIG. 4 includes a plurality of decision blocks designed to detect the actuation of the keys of the keyboard 13. The first decision block 21 is an any key depressed test. The keystroke identifier remains in a loop around this test until a key is pressed. After a key is pressed, the keystroke identifier performs in seriatim twelve tests, each directed to determining if one of the twelve keys has been released. The keystroke identifier remains in a loop formed by the twelve key tests until all keys have been released. More specifically, the loop is formed by a number 1 key release test 23, a number 2 key release test 25, a number 3 key release test 27, a number 4 key release test 29, a number 5 key release test 31, a number 6 key release test 33, a number 7 key release test 35, a number 8 key release test 37, a number 9 key release test 39, a * key release test 41, a number 0 key release test 43, and a # key release test 45. Both the positive (YES) and negative (NO) results of each test cause the keystroke identifier to cycle to the next test. After all twelve key tests have been performed, an all keys release test 47 occurs. If this test is negative, the loop is repeated.

FIG. 4 also includes a memory 49 and a clock 51. The positive (YES) results of the twelve key tests are stored in the memory. The memory also stores timing data produced by the clock 51. The positive (YES) result of the all keys released test enables the memory to store the data received from the twelve key tests and the clock and restart the test sequence.

As will be readily appreciated from the foregoing description and viewing FIG. 4, the keystroke identifier 15 detects and stores (temporarily) the actuations of the keys of the keypad 13. If only one key is actuated, the actuation is stored. If two keys are simultaneously actuated, the actuation is stored. If there is a delay between the detection of two key actuations, the timing information can be used to determine if the two keys were substantially simultaneously actuated and, thus, indicate a letter entry, function action, or mode of operation change.

More specifically, the clock data begins when a first key release is detected and ends when a second key release is detected. Thus, the stored clock signal represents the time between key releases. The time interval will be relatively short if the keys are adjacent keys that are simultaneously actuated and longer if the keys are sequentially actuated. The clock data may also be used to reset the memory after the memory data has sufficient time to have been read and analyzed by the keystroke recognizer.

FIG. 5 is a functional flow diagram illustrating a keystroke recognizer suitable for use in FIG. 1. The keystroke recognizer is enabled or starts after the key release or releases have been stored in memory. In essence, the keystroke recognizer is enabled when the all keys released test is an affirmative (YES). After starting, a test 61 is performed to determine if only one key release has been detected. If only one key release has been detected, a test 63 is performed to determine if the released key indicates that a specific function is to occur. If the released key indicates that a specific function, such as a backspace, is to occur, the function is performed 65. If the released key does not indicate that a specific function is to occur, a test 67 is performed to determine if the key actuation indicates a mode of operation change. If the key actuation indicates that a mode of operation change is to occur, the mode of operation is changed 69. If the released key does not indicate that a mode of operation change is to occur, the letter associated with the key is determined and displayed 71. Thereafter, the functions of keystroke recognizer 17 end.

If more than one key release has been detected, the time between key releases is determined 73 using the clock information recorded when the key releases were detected in the manner previously described. Then a test 75 is performed to determine if the time is less than a predetermined number (X) of milliseconds, which indicates whether the keys were substantially simultaneously released or separately actuated and released. If the time is less than the X milliseconds, a test 77 is made to determine if the released keys indicate that a specific function is to occur. If the released keys indicate that a specific function is to occur, the function is performed 79. If the released keys do not indicate that a specific function is to occur, a test 81 is made to determine if the mode of operation is to change. If the mode of operation is to change, the mode of operation of the keyboard is changed 83. If the released keys do not indicate that a mode of operation change is to occur, the letter associated with the released keys is determined and displayed 85. Then the functions of the keystroke recognizer 17 end.

If the time is not less than X milliseconds (the time is greater than X milliseconds), the mode associated with the released key is determined and enabled 87. For example, the time between the released keys may indicate that the keys were not substantially simultaneously actuated. The nature of the keys and/or the longer time period may be interpreted as instructions to perform a specific function, such as turning off power to the device implementing the invention. Thereafter, the keystroke recognizer ends. As a result, as shown in FIG. 1, the keystroke recognizer either causes a letter to be displayed, a function to be performed or a mode change to occur.

As will be readily appreciated by those skilled in the art and others, as noted above, FIGS. 4 and 5 are functional diagrams that should be construed as exemplary and not limiting. Many other well-known ways of mapping key actuation to letters, functions, or mode changes may be employed in actual implementations of the invention.

While the preferred implementations of the invention has been illustrated and described, as will be readily appreciated by those skilled in the art and others, various changes can be made therein. For example, while the described implementation detects and stores key releases, other implementations may detect and store key presses. Such an implementation may be preferred with hardware that clears key memory on first key release. Further, while the described implementation is limited to the detection of single and two side-by-side key actuations, other implementations may detect additional multiple side-by-side key actuations created by a single finger or thumb, such as three or four side-by-side key actuations. Obviously, such implementations are dependent on the size of the keypad. Further, in addition to keys being simultaneously depressed and released, the keys may be simultaneously depressed and independently released, or independently depressed, simultaneously held and independently released. Thus, within the scope of the appended claims it is to be understood that the invention can be practiced otherwise than as specifically described herein.

The embodiments of the invention in which an exclusive property or privilege is claimed are defined as follows:

1. A method for entering text using a keypad comprising a number of keys fewer than the number of items in the text to be entered, comprising:
   (a) detecting the actuation of the keys of the keypad;
   (b) determining if the detected actuation was created by the actuation of one key or the substantially simultaneous actuation of multiple keys by using a stored clock signal to detect a delay for substantially simultaneous actuation of multiple adjacent keys or otherwise the actuation of one key, the act of determining being not executed if a result of an all keys released test is negative, and the act of determining being executed if the result of the all keys released test is positive, enabling a clock from which the stored clock signal originates;
   (c) if the detected key actuation was created by the actuation of one key chosen from a group of "1", "2", "3", "4", "5", "6", "7", "8", "9", "*", "0", and "#", entering the item associated with the one key that is respectively chosen from a group of "g", "b","e","i", "k","n","q ","u", "x", "s", all caps mode, and backspace function; and
   (d) if the detected key actuation was created by the substantially simultaneous actuation of multiple keys chosen from a group of "1" and "2", "2" and "3", "4" and "5", "5" and "6 ", "7" and "8", "8" and "9", "*" and "0", "0" and "#", "1" and "4", "2" and "5", "3" and "6", "4" and "7", "5" and "8", "6" and "9" associated with the multiple keys that is respectively chosen from a group of "a", "d", "j", "m", "t","w","z", numerical mode, "h","c","f","p","l","o","r","v", and "y".

2. The method claimed in claim 1 wherein the items of text are letters.

3. The method claimed in claim 2 wherein the letters are English language letters.

4. The method claimed in claim 1 wherein the keypad comprises a row/column matrix of keys.

5. The method claimed in claim 4 wherein the items of text are letters.

6. The method claimed in claim 5 wherein the letters are English language letters.

7. The method claimed in claim 4 wherein said keypad is a 12 key keypad.

8. A method for entering text as claimed in claim 7 wherein the keypad is a three row by four column 12 key keypad.

9. The method claimed in claim 8 wherein the items of text are letters.

10. The method claimed in claim 9 wherein the letters are English language letters.

11. The method claimed in claim 1 wherein the multiple keys are located side by side.

12. The method claimed in claim 11 wherein the multiple keys are two keys.

13. Computer-readable media containing instructions executed by a computer for carrying out the method of any one of claims 1-12.

14. In a device containing a keypad formed of a plurality of keys oriented in a row/column matrix, the improvement comprising computer-executable code for:
  (a) detecting the actuation of the keys of the keypad;
  (b) determining if the detected actuation was created by the actuation of one key or the substantially simultaneous actuation of two keys by using a stored clock signal to detect a delay for substantially simultaneous actuation of multiple adjacent keys or otherwise the actuation of one key, the act of determining being not executed if a result of an all keys released test is negative, and the act of determining being executed if the result of the all keys released test is positive, enabling a clock from which the stored clock signal originates;
  (c) if the detected key actuation is created by the actuation of one key chosen from a group of "1", "2", "3", "4", "5", "6", "7", "8", "9", "*", "0", and "#", entering a text item associated with the one key that is respectively chosen from a group of "a", "c", "e", "i", "k", "m", "q", "s", "u", "y", all caps mode, and backspace function; and
  (d) if the detected key actuation is created by the substantially simultaneous actuation of two keys chosen from a group of "1" and "2", "2" and "3", "4" and "5", "5" and "6", "7" and "8", "8" and "9","7" and "*","8" and "0" and "9" and "#", entering a text item associated with the two keys that is respectively chosen from a group of "b", "d", "j", "l", "r", "t", "z", numerical mode, "f", "g", "h", "n", "o", "p", "v", "w", and "x".

15. The improvement claimed in claim 14 wherein the text items are letters.

16. The improvement claimed in claim 15 wherein the letters are English language letters.

17. The improvement claimed in claim 14 wherein keypad comprises a row/column matrix of keys.

18. The improvement claimed in claim 17 wherein the text items are letters.

19. The improvement claimed in claim 18 wherein the letters are English language letters.

20. The improvement claimed in claim 17 wherein the keypad is a 12 key keypad.

21. An improvement for entering text as claimed in claim 20 wherein the keypad is a three row by four column 12 key keypad.

22. The improvement claimed in claim 21 wherein the text items are letters.

23. The improvement claimed in claim 22 wherein the letters are English language letters.

24. The improvement claimed in claim 14 wherein the two keys are located side by side.

25. The improvement claimed in claim 24 wherein the keys are two keys that are not separated by another key.

* * * * *